United States Patent
Cordeiro et al.

(10) Patent No.: US 9,414,380 B2
(45) Date of Patent: Aug. 9, 2016

(54) MILLIMETER-WAVE COMMUNICATION STATION AND METHOD FOR MULTIPLE-ACCESS BEAMFORMING IN A MILLIMETER-WAVE COMMUNICATION NETWORK

(71) Applicant: Intel Corporation, Santa Clara, CA (US)

(72) Inventors: Carlos Cordeiro, Portland, OR (US); Assaf Kasher, Haifa (IL); Solomon B. Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/097,356

(22) Filed: Dec. 5, 2013

(65) Prior Publication Data

US 2014/0161105 A1 Jun. 12, 2014

Related U.S. Application Data

(63) Continuation of application No. 12/574,140, filed on Oct. 6, 2009, now Pat. No. 8,625,565.

(51) Int. Cl.
*H04W 72/04* (2009.01)
*H04B 7/06* (2006.01)

(52) U.S. Cl.
CPC ......... *H04W 72/0446* (2013.01); *H04B 7/0617* (2013.01); *H04B 7/0619* (2013.01)

(58) Field of Classification Search
USPC ....................................................... 370/339
See application file for complete search history.

(56) References Cited

U.S. PATENT DOCUMENTS 7,386,305 B2   6/2008  Etkin et al.
8,331,265 B2 * 12/2012  Yong et al. ................ 370/254

(Continued)

FOREIGN PATENT DOCUMENTS

CN   104079334 A   10/2014
JP   2012501591 A   1/2012

(Continued)

OTHER PUBLICATIONS

"U.S. Appl. No. 12/574,140, Final Office Action mailed Mar. 12, 2013", 41 pgs.

(Continued)

*Primary Examiner* — Jenee Williams
(74) *Attorney, Agent, or Firm* — Schwegman Lundberg & Woessner, P.A.

(57) ABSTRACT

Embodiments of a millimeter-wave communication station and method for multiple-access beamforming in a millimeter-wave network are generally described herein. In some embodiments, an initiating station performs multiple-access beamforming with one or more responding stations by announcing a number of sector-sweep (SS) slots of a beamforming training (BFT) period and a number of SS frames of each SS slot. One or more SS frames are received from one or more of the responding stations within one of the SS slots of the BFT period. The initiating station transmits one or more SS feedback frames to the responding stations within the one SS slot to indicate an antenna configuration to the responding stations for communication with the initiating station. The responding stations transmit a limited number of SS frames per SS slot based on the number of SS frames announced by the initiating station and transmit any additional SS frames in a next SS slot of the beamforming training period. Each SS frame contains an indication to the initiating station of an antenna configuration for communication with the responding station.

24 Claims, 6 Drawing Sheets

(56) References Cited

U.S. PATENT DOCUMENTS

| | | | |
|---|---|---|---|
| 8,335,167 B1* | 12/2012 | Zhang et al. | 370/252 |
| 8,422,961 B2* | 4/2013 | Kafle | 455/67.14 |
| 8,625,565 B2 | 1/2014 | Cordeiro et al. | |
| 2002/0061730 A1* | 5/2002 | Hart et al. | 370/336 |
| 2003/0195017 A1 | 10/2003 | Chen et al. | |
| 2004/0038658 A1 | 2/2004 | Gurelli et al. | |
| 2004/0203905 A1 | 10/2004 | Cuffaro | |
| 2004/0204106 A1 | 10/2004 | Gurelli et al. | |
| 2005/0147115 A1 | 7/2005 | Li et al. | |
| 2005/0277444 A1 | 12/2005 | Rensburg et al. | |
| 2006/0052114 A1 | 3/2006 | Cuffaro | |
| 2006/0105771 A1 | 5/2006 | Iacono et al. | |
| 2006/0164969 A1 | 7/2006 | Malik et al. | |
| 2006/0172710 A1 | 8/2006 | Cahana et al. | |
| 2006/0240780 A1 | 10/2006 | Zhu et al. | |
| 2007/0191063 A1 | 8/2007 | Iacono et al. | |
| 2007/0230373 A1 | 10/2007 | Li et al. | |
| 2007/0232245 A1 | 10/2007 | Cheng | |
| 2007/0238156 A1 | 10/2007 | Hughes et al. | |
| 2008/0165720 A1 | 7/2008 | Hu et al. | |
| 2008/0181344 A1 | 7/2008 | Jiang et al. | |
| 2008/0194204 A1 | 8/2008 | Duet et al. | |
| 2009/0061784 A1 | 3/2009 | Cordeiro | |
| 2009/0232023 A1 | 9/2009 | Soffer et al. | |
| 2009/0232240 A1 | 9/2009 | Lakkis | |
| 2009/0232245 A1 | 9/2009 | Lakkis | |
| 2009/0238156 A1 | 9/2009 | Yong et al. | |
| 2010/0054223 A1* | 3/2010 | Zhang et al. | 370/338 |
| 2010/0056062 A1* | 3/2010 | Zhang et al. | 455/63.1 |
| 2010/0103045 A1* | 4/2010 | Liu et al. | 342/372 |
| 2010/0111215 A1 | 5/2010 | Nandagopalan et al. | |
| 2010/0118716 A1 | 5/2010 | Lakkis et al. | |
| 2010/0118835 A1* | 5/2010 | Lakkis et al. | 370/336 |
| 2010/0142443 A1 | 6/2010 | Chou et al. | |
| 2010/0214169 A1* | 8/2010 | Kafle | 342/368 |
| 2010/0215027 A1* | 8/2010 | Liu et al. | 370/338 |
| 2010/0265922 A1* | 10/2010 | Bracha | 370/336 |
| 2010/0265924 A1* | 10/2010 | Yong et al. | 370/336 |
| 2010/0265925 A1* | 10/2010 | Liu et al. | 370/336 |
| 2011/0064033 A1 | 3/2011 | Gong et al. | |
| 2011/0069688 A1* | 3/2011 | Zhang et al. | 370/338 |
| 2011/0080898 A1 | 4/2011 | Cordeiro et al. | |
| 2011/0110340 A1* | 5/2011 | Lakkis | H04W 74/08 370/336 |

FOREIGN PATENT DOCUMENTS

| | | |
|---|---|---|
| JP | 2012507946 A | 3/2012 |
| JP | 2012524459 A | 10/2012 |
| JP | 2013504974 A | 2/2013 |
| RU | 2496231 C1 | 10/2013 |
| WO | WO-2006049714 A2 | 5/2006 |
| WO | WO-2011043901 A2 | 4/2011 |
| WO | WO-2011043901 A3 | 4/2011 |

OTHER PUBLICATIONS

"U.S. Appl. No. 12/574,140, Non Final Office Action mailed Aug. 22, 2012", 34 pgs.

"U.S. Appl. No. 12/574,140, Notice of Allowance mailed Sep. 4, 2013", 11 pgs.

"U.S. Appl. No. 12/574,140, Response filed May 22, 2013 to Final Office Aciton mailed Mar. 12, 2013", 13 pgs.

"U.S. Appl. No. 12/574,140, Response filed Nov. 21, 2012 to Non Final Office Action mailed Aug. 22, 2012", 15 pgs.

"Chinese Application Serial No. 201010506918.5, Office Action mailed Mar. 5, 2013", 13 pgs.

"Chinese Application Serial No. 201010506918.5, Office Action mailed Sep. 12, 2013", 7 pgs.

"Chinese Application Serial No. 201010506918.5, Response filed Jul. 20, 2013 to Office Action mailed Mar. 5, 2013", 12 pgs.

"European Application Serial No. 10822408.0, Response filed Jun. 22, 2012 to Office Action mailed May 15, 2012", 36 pgs.

"International Application Serial No. PCT/US2010/048724, International Preliminary Report on Patentability mailed Apr. 19, 2012", 6 pgs.

"International Application Serial No. PCT/US2010/048724, Search Report mailed May 26, 2011", 5 pgs.

"International Application Serial No. PCT/US2010/048724, Written Opinion mailed May 26, 2011", 4 pgs.

"Japanese Application Serial No. 2012-533192, Office Action mailed Jun. 4, 2013", 3 pgs.

"Japanese Application Serial No. 2012-533192, Response filed Aug. 15, 2013 to Office Action mailed Jun. 4, 2013", 12 pgs.

"European Application Serial No. 10822408.0, Extended European Search Report mailed Dec. 4, 2014", 4 pgs.

"European Application Serial No. 14163996.3, Extended European Search Report mailed Dec. 16, 2014", 7 pgs.

"European Application Serial No. 14163996.3, Office Action mailed Jan. 19, 2015", 2 pgs.

"European Application Serial No. 14163996.3, Response filed Jul. 14, 2015 to Office Action mailed Jan. 19, 2015", 12 pgs.

\* cited by examiner

ANTENNA SECTORS

PORTION OF AN ANTENNA ARRAY

MILLIMETER-WAVE COMMUNICATION STATION AND METHOD FOR MULTIPLE-ACCESS BEAMFORMING IN A MILLIMETER-WAVE COMMUNICATION NETWORK

This application is a continuation of U.S. patent application Ser. No. 12/574,140, filed on Oct. 6, 2009, now issued as U.S. Pat. No. 8,625,565, which is incorporated herein by reference in its entirety.

TECHNICAL FIELD

Embodiments pertain to millimeter-wave communication stations and methods for performing beamforming. Some embodiments pertain to wireless networks that use millimeter-wave frequencies to communicate, such as wireless personal area networks (WPANs) and wireless local area networks (WLANs). Some embodiments relate to millimeter-wave networks operating in accordance with specifications of the wireless gigabit alliance (WGA).

BACKGROUND

Many conventional wireless networks communicate using microwave frequencies generally ranging between two and ten gigahertz (GHz). These systems generally employ either omnidirectional or low-directivity antennas primarily because of the comparatively long wavelengths of the frequencies used. The low directivity of these antennas limits the throughput of such systems, making applications such as real-time video streaming and high-definition television (HDTV) difficult to implement. The millimeter-wave band has the available spectrum and is capable of providing significantly higher-level throughputs; however, due to higher attenuation levels of millimeter-waves, more directional antennas and beamforming techniques are employed. Beamforming allows a pair of stations to achieve a desirable link budged for subsequent communications.

One issue with millimeter-wave networks is collisions that occur between communication stations attempting to establish or reestablish a link and perform beamforming training. Conventionally, only a single communication station at a time is able to perform beamforming training with the network coordinator (e.g., a Piconet Coordinator Point (PCP), Access Point, or Coordination Point). This may result in a significant delay when multiple responding stations are attempting to establish or reestablish a link at the same time (i.e. within the same beacon interval).

Thus, there are general needs for millimeter-wave communication stations and methods for multiple-access beamforming that allow more than one responding station to perform beamforming training with a network coordinator.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
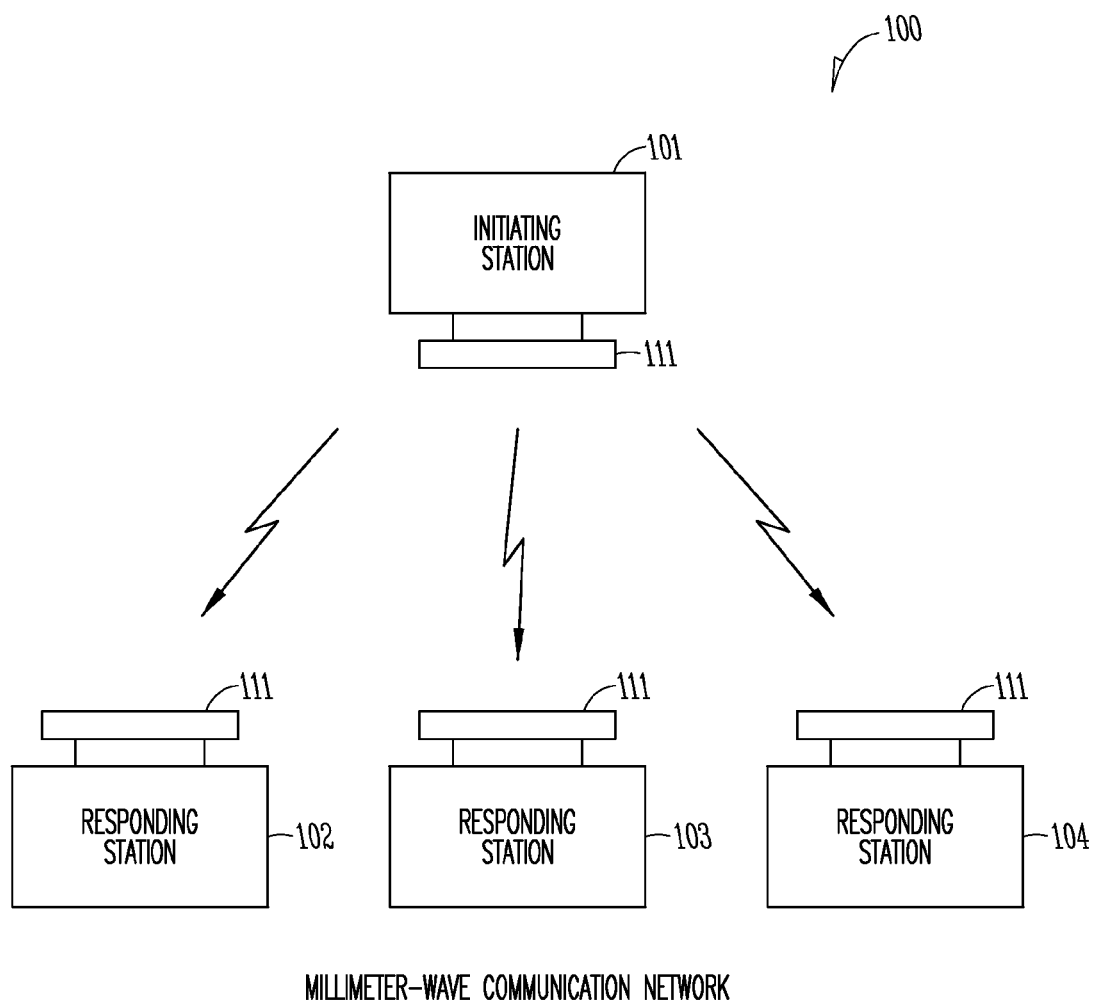
FIG. 1 is a millimeter-wave communication network, in accordance with some embodiments.

FIG. 1 is a millimeter-wave communication network in accordance with some embodiments. Millimeter-wave communication network 100 includes a plurality of millimeter-wave communication stations 101-104 that communicate using millimeter waves. Millimeter-wave communication stations 101-104 may utilize array antennas 111 to communicate within one or more antenna sectors. One of the stations, such as communication station 101, may act as the network coordinator (such as a PCP) to coordinate communications among the communication stations 101-104 and control access to the wireless medium. The network coordinator may broadcast a beacon frame that indicates the length of a beacon interval during which communications are to take place. The beacon frame may be received by the other stations 102-104, thereby informing the other stations 102-104 as to when the next beacon interval will occur. In some embodiments, the next beacon interval may be identified by a beacon transmission.

In accordance with some embodiments, communication station 101 may act as an initiating station to initiate beamforming training (BFT) with other communication stations, such as stations 102-104, which may be referred to as responding stations. In these embodiments, the initiating station 101 may perform multiple-access beamforming with one or more responding stations, such as responding stations 102 and 103. The initiating station 101 may announce a number of sector-sweep (SS) slots of a BFT period and a number of SS frames within each SS slot. The initiating station 101 may receive one or more SS frames from two or more of the responding stations within one of the SS slots of the BFT period and may transmit one or more SS feedback frames to the responding stations within the one SS slot to indicate an antenna configuration to the responding stations for communication with the initiating station 101. The indicated antenna configuration may refer to a particular antenna sector.

The responding stations transmit a limited number of SS frames per SS slot based on the number of SS frames announced by the initiating station 101. The responding stations may transmit any additional SS frames in a next SS slot of the beamforming training period. Accordingly, more than one responding station can perform beamforming within a beacon interval. Furthermore, the limitation on the number of SS frames within an SS slot helps reduce collisions, which may increase the success rate of SS frames being received by the initiating station 101. For multiple-access beamforming, the initiating station is configured to receive at least two reverse sector-sweep frames from two or more of the responding stations within either a single sector-sweep slot or separate sector-sweep slots of the beamforming training period. These embodiments are described in more detail below.

In some embodiments, communication stations 101-104 may use the same frequency band for transmitting and receiving. In these embodiments, the communication stations 101-104 may employ a time-division multiplexed (TDM) communication technique.

In some embodiments, communication stations 101-104 of millimeter-wave communication network 100 may communicate substantially in accordance with specific communication standards or proposed specifications, such as the Institute of Electrical and Electronics Engineers (IEEE) standards, including the IEEE 802.15 standards and proposed specifications for millimeter-wave communications (e.g., the IEEE 802.15 task group 3c Call For Intent (CFI) dated December 2005), although the scope of the invention is not limited in this respect as they may also be suitable to transmit and/or receive communications in accordance with other techniques and standards. For more information with respect to the IEEE 802.15 standards, please refer to "IEEE Standards for Information Technology—Telecommunications and Information Exchange between Systems"—Part 15. In some embodiments, communication stations 101-104 of millimeter-wave communication network 100 may communicate substantially in accordance within accordance with specifications of the WGA.

Figure 2A:
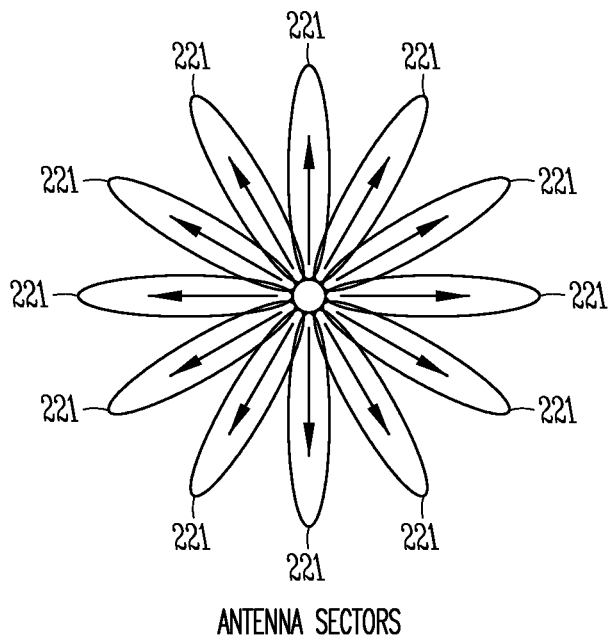
FIG. 2A illustrates a plurality of antenna sectors provided by an array antenna of a millimeter-wave communication station, in accordance with some embodiments.

FIG. 2A illustrates a plurality of antenna sectors provided by an array antenna of a millimeter-wave communication station, in accordance with some embodiments. An array antenna, such as array antenna 111 (FIG. 1), may be used to provide the plurality of antenna sectors 221. Although FIG. 2A shows only twelve antenna sectors 221 for illustrative purposes, array antenna 111 may provide a lesser or greater number of antenna sectors 221. In some embodiments, the array antenna 111 may provide up to fifty or more antenna sectors 221.

Figure 2B:
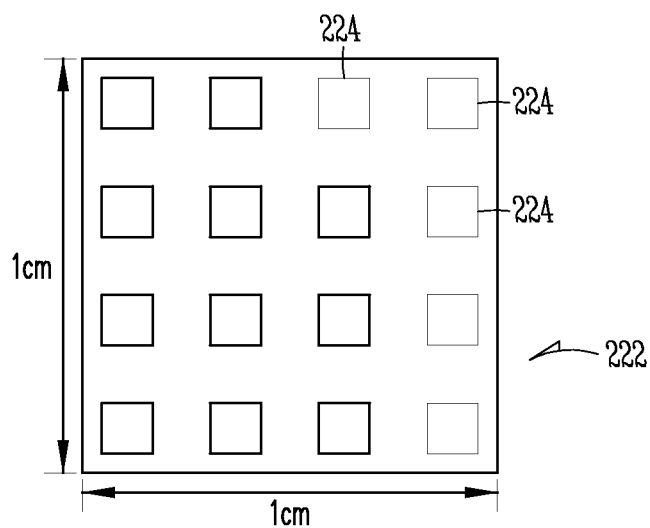
FIG. 2B illustrates a portion of an array antenna, in accordance with some embodiments.

FIG. 2B illustrates a portion of an array antenna, in accordance with some embodiments. In these embodiments, portion 222 may be a portion of an array antenna, such as array antenna 111 (FIG. 1), and may comprise a plurality of antenna elements 224 configured to transmit and receive millimeter-wave signals within antenna sectors 221 (FIG. 2A) utilizing beamforming techniques. The plurality of antenna elements 224 may provide a higher gain and allow beamwidth and beam direction to be controlled by signal processing techniques either in analog or digital domain. In these embodiments, array antenna 111 may operate as a phased array with a predetermined spacing between the antenna elements 224.

In some embodiments, the millimeter-wave communication stations 101-104 (FIG. 1) may utilize one or more array antennas 111 which may be configured to selectively transmit in each antenna sector 221. In some embodiments, at least two antenna elements 224 may be used per each antenna sector 221. In some embodiments, the array antenna 111 may comprise up to 64 or more antenna elements 224 configurable to transmit in any one or more of the antenna sectors 221.

Figure 3:
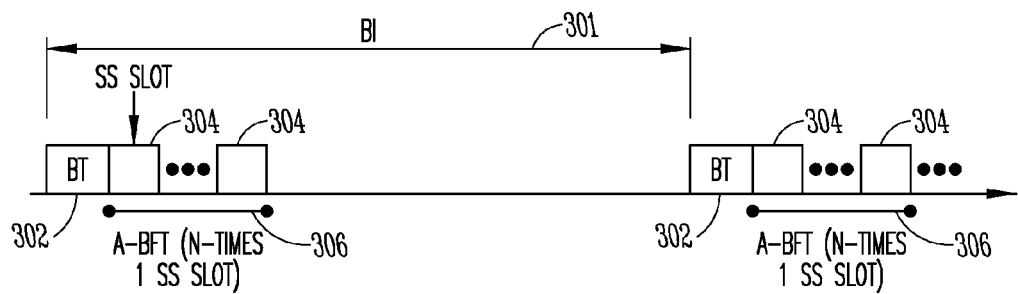
FIG. 3 illustrates the slot structure of a beamforming training period, in accordance with some embodiments.

FIG. 3 illustrates the slot structure of a beamforming training period, in accordance with some embodiments. Beacon interval (BI) 301 includes a BFT period 306, which may comprise a number of SS slots 304 and may be preceded by one or more beacon transmissions, which may be collectively referred to as beacon time (BT) 302. Beacon intervals 301 may repeat on a regular basis as illustrated.

In accordance with multiple-access beamforming embodiments, the initiating station may announce the number of SS slots 304 of the BFT period 306 and the number of sector sweep SS frames of each SS slot 304 in a beacon transmission of the current beacon interval 301. A beacon transmission may comprise a sector sweep comprising beacon frames transmitted by the initiating station 101 for receipt by responding stations, such as responding stations 102-104. In these embodiments, the announced number of SS slots 304 of the BFT period 306 may follow the BT 302 in the current beacon interval 301. In other words, the beacon transmission announcing the number of SS slots 304 precedes the SS slots 304. In some embodiments, the BFT period 306 is an association beamforming training (A-BFT) period, although this is not a requirement.

Figure 4:
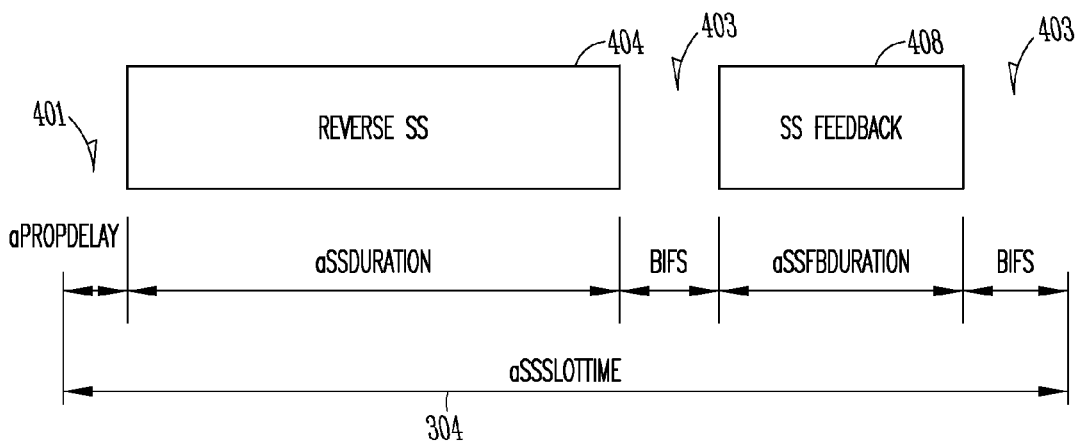
FIG. 4 illustrates a configuration of a sector-sweep slot, in accordance with some embodiments.

FIG. 4 illustrates a configuration of a sector-sweep slot, in accordance with some embodiments. The SS slot 304 comprises a first duration 404 for the number of SS frames per SS slot 304 announced by the initiating station 101, and a second duration 408 for a single SS feedback frame. In some embodiments, each SS slot 304 may include propagation delay time (aPropDelay) 401 to account for a propagation delay between the initiating station 101 (FIG. 1) and a responding station 102 (FIG. 1), and beamforming interface space (BFIS) 403 (or a short inter Frame Space (SIFS)) between the first duration 404 and the second duration 408. The first duration 404 may be a time duration (aSSDuration) for a responding station 102 to transmit the predetermined number of SS frames to the initiating station. The second duration 408 may be a time duration (aSSFBDuration) 408 for the initiating station 101 to transmit at least the single SS feedback frame to one of the responding stations 102. In these embodiments, the BFIS 403 may be a constant and may also be provided after second duration 408.

Figure 5:
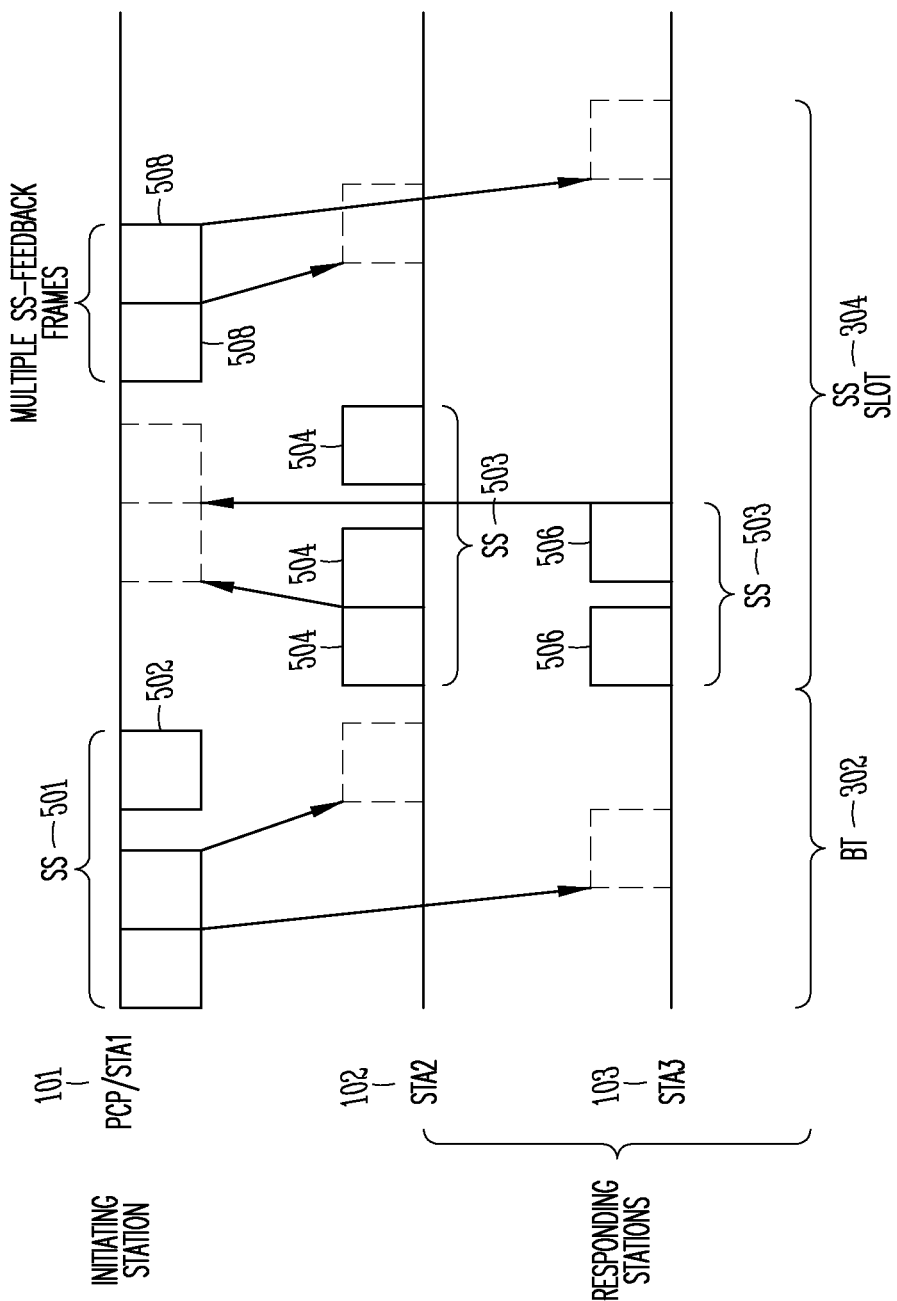
FIG. 5 illustrates communications between an initiating station and responding stations for multiple-access beamforming, in accordance with some embodiments.

FIG. 5 illustrates communications between an initiating station and responding stations for multiple-access beamforming, in accordance with some embodiments. For multiple-access beamforming, the initiating station 101 may transmit one or more beacon frames 502 as a sector sweep 501 within the BT 302 of the current beacon interval 301 (FIG. 3). The sector sweep 501 may comprise a plurality of beacon frames 502 and may indicate that the initiating station 101 wishes to perform BFT. The initiating station 101 may announce in the beacon transmission the number of SS slots 304 of the BFT period 306 (FIG. 3) and the number of SS frames of each SS slot 304.

The initiating station 101 may receive one or more SS frames 504, 506 from two or more of the responding stations within one of the SS slots 304 of the BFT period 306 (FIG. 3). In response, the initiating station 101 may transmit one or more SS feedback frames 508 to the responding stations 102 and 103 within the SS slot 304. The SS feedback frames 508 may be used to indicate the antenna configuration for communication with the initiating station 101 to the responding stations 102 and 103. In accordance with some embodiments, the responding stations 102 and 103 transmit a limited number of SS frames 504 per SS slot 304 based on the number of SS frames announced by the initiating station 101. The responding stations may transmit any additional SS frames 504 in a next SS slot of the BFT period 306.

In these embodiments, the number of SS frames per SS slot 304 that is announced in the beacon transmission may be a total number of SS frames that can be transmitted in an SS slot 304. If a responding station has, for example, thirty-six antenna sectors but the SS slot 304 can only admit six SS frames 504, the responding station will use six SS slots 304 to complete a full reverse sector sweep.

Although the network coordinator for millimeter-wave communication network 100 is described herein as the initiating station (i.e., the station that is initiating beamforming), this is not a requirement as any station, not necessarily the network coordinator, may operate as an initiating station and initiate beamforming.

In some embodiments, the initiating station 101 may perform multiple-access beamforming for scheduling A-BFT with one or more responding stations in millimeter-wave communication network 100. In these embodiments, more than one responding station is able to schedule and perform A-BFT within a single beacon interval.

In some embodiments, the antenna configuration indicated in the SS feedback frames 508 may indicate an antenna sector 221 (FIG. 2A) for each of the responding stations to use in communicating with the initiating station 101. In these embodiments, the initiating station 101 may use the SS frames 504 from the responding stations to identify the antenna sector 221 of a responding station from which the highest quality SS frame was received. The initiating station may indicate the antenna sector 221 to the responding stations in an SS feedback frame 508 for use in subsequent communications by the responding stations. The SS frames 504 from the responding stations may also indicate to the initiating station 101 that a responding station wishes to complete BFT and subsequently communicate with the initiating station 101. The SS frames 504 from the responding stations may also indicate to the initiating station 101 the antenna sector 221 that the initiating station is to use for communication with each responding station.

In some embodiments, the sector sweep 501 comprises a beacon frame 502 transmitted in each of a plurality of antenna sectors of the initiating station 101 during the current beacon transmission. The responding stations, such as responding stations 102 and 103, may transmit one SS frame 504 in each of their antenna sectors. The responding stations 102 and 103 remain in a receive mode to receive a beacon frame and an SS feedback frame 508 from the initiating station 101. The initiating station 101 may remain in a receive mode to receive an SS frame 504 from the responding stations 102 and 103. In some embodiments, the responding stations 102 and 103 remain in an omni-directional receive mode to receive the SS feedback frames 508, although this is not a requirement. In some embodiments, a responding station may transmit more than one SS frame 504 in each of their antenna sectors, although this is not a requirement.

Random Backoff Embodiments:

In accordance with some random-backoff embodiments, a responding station may initiate a random backoff procedure at the start of the BFT period 306 to determine with which SS slot 304 of the BFT period 306 to begin transmissions of the SS frames 504. The responding station may limit the number of SS frames 504 transmitted per SS slot 304 as indicated by the initiating station 101 in the beacon transmission. The responding station may resume transmission of the SS frames 504 at a start of a next SS slot within the current BFT period 306 when the responding station 102 has more SS frames 504 to transmit.

In accordance with these random-backoff embodiments, when the responding station 102 does not receive an SS feedback frame 508 from the initiating station 101 until completion of a reverse sector sweep 503, the responding station 102 may retransmit the SS frames 504 within the same BFT period 306 of the current beacon interval 301. The responding station 102 may also initiate a random backoff procedure to determine which SS slot following the completion of a prior reverse sector sweep 503 to retransmit the SS frames 504. SS frames 504 may be considered reverse SS frames.

In these random-backoff embodiments, the initiating station 101 may schedule time in the beacon interval 301 for each of the responding stations to complete beamforming, including performing a beamforming refinement phase (BRP) within the current beacon interval 301 or the next beacon interval. The initiating station 101 may transmit a schedule in SS feedback frames 508 to indicate to each responding station when to perform beamforming refinement. In these embodiments, feedback frames 508 may be referred to as grant frames. In some embodiments, the BRP may occur anytime in the beacon interval 301 after a responding station has completed the SS phase in the BFT period 306. During the BRP, beamforming coefficients may be generated to direct antenna beams for reception and transmission of signals with the other station.

In some embodiments, the initiating station 101 may send more than a single SS feedback frame 508 within the SS slot 304 when there is time remaining in the SS slot 304. In an example embodiment in which the size of SS slot 304 is eight frames, if there are two responding stations that have one and two antenna sectors respectively, only two SS frames are needed to complete a reverse sector sweep 503. After completion of their reverse sector sweeps 503, additional time remains in the current SS slot 304 for the initiating station 101 to send SS feedback frames 508 to both of these responding stations. In these embodiments, the second duration 408 (FIG. 4) is not limited to a single SS feedback frame 508.

Figure 6:
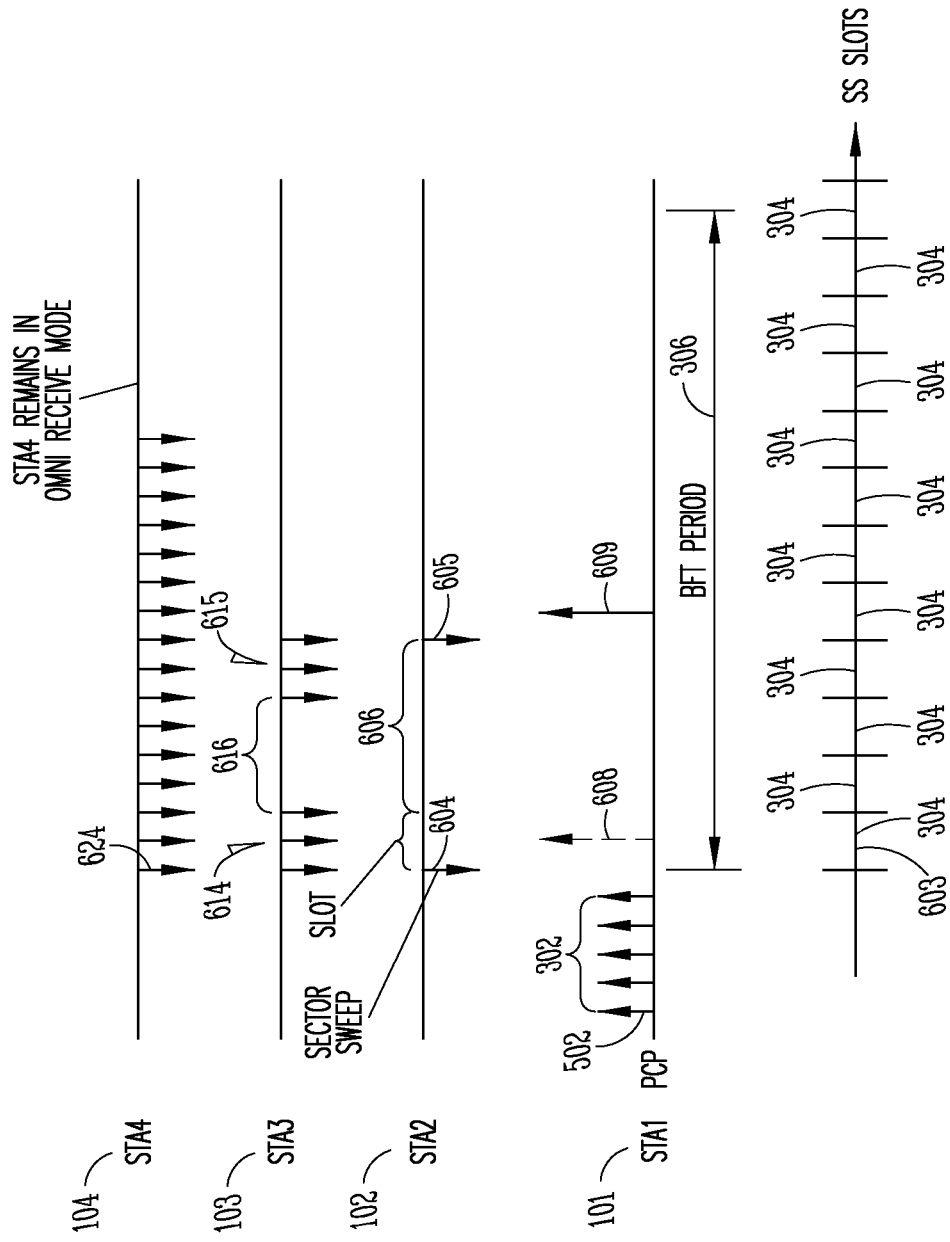
FIG. 6 illustrates communications between an initiating station and responding stations for multiple-access beamforming, in accordance with some alternate embodiments.

FIG. 6 illustrates communications between an initiating station and responding stations for multiple-access beamforming, in accordance with some alternate embodiments. As shown in FIG. 6, the initiating station 101 may transmit beacon frames 502 during beacon time 302. In these alternate embodiments, a responding station, such as responding station 102, may transmit one SS frame 604 within a first SS slot 603 of the BFT period 306 following the beacon transmission. When an SS feedback frame 608 is not received by the responding station 102 until after completion of its entire reverse sector sweep, the responding station 102 may initiate a backoff procedure to determine a backoff period 606 comprising a random number of SS slots 304 to delay transmissions of additional SS frames 605 within the BFT period 306. At the completion of the SS frame 605, the responding station 102 may switch to a receive mode to receive an SS feedback frame 609. In these embodiments, a reverse sector sweep may comprise all SS frames transmitted by a responding station. The responding station may transmit one SS frame in each antenna sector.

In these alternate embodiments, a responding station 102 may refrain from delaying transmissions of the additional SS frames 605 after the backoff period 606 when an SS feedback frame is received during the backoff period 606. The responding station may also stop transmitting any of the additional SS frames 605 after an SS feedback frame 609 is received.

In these alternate embodiments, when the remaining time in the BFT period 306 after the backoff period 606 is less than the time for an SS frame 605 and an SS feedback frame 608, the responding station may remain in receive mode until the end of the BFT period (e.g., in case it is able to receive an SS feedback frame 609).

As illustrated in the example of FIG. 6, each responding station 102, 103 and 104 may have a different number of antenna sectors and, accordingly, the time that each station completes a reverse transmit sector sweep is different. For example, responding station 102 may have a single antenna sector and transmit a single SS frame 604 for its reverse sector sweep, while responding station 103 may have three antenna sectors and may transmit three SS frames 614 for its reverse sector sweep, and responding station 104 may have sixteen antenna sectors and may transmit sixteen SS frames 624 for its reverse sector sweep. In this example, since responding station 103 did not receive a sector sweep feedback frame during transmission of it reverse sector sweep (i.e., three SS frames 614), it may initiate a backoff procedure to determine a backoff period 616 to delay transmissions of additional reverse SS frames 615 within the BFT period 306.

Figure 7:
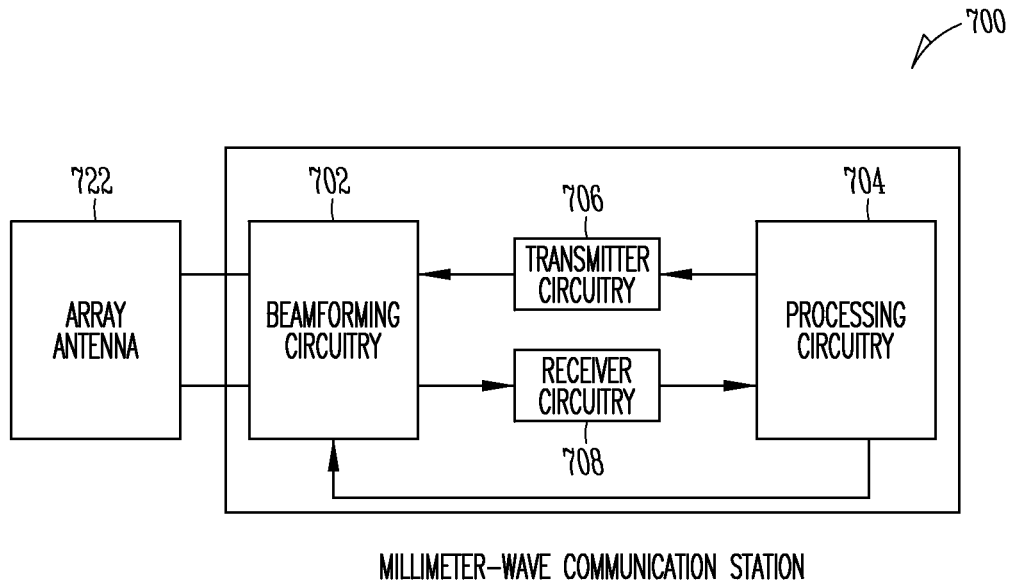
FIG. 7 is a block diagram of a millimeter-wave communication station, in accordance with some embodiments.

FIG. 7 is a block diagram of a millimeter-wave communication station, in accordance with some embodiments. Millimeter-wave communication station 700 may include, among other things, an array antenna 722, beamforming circuitry 702, transmitter circuitry 706, receiver circuitry 708 and processing circuitry 704. Millimeter-wave communication station 700 may be suitable for use as any one or more of millimeter-wave communication stations 101-104 (FIG. 1) and as discussed above. Array antenna 722 may include a plurality of antenna elements and may be configured to communicate in a plurality of antenna sectors, such as antenna sectors 221 FIG. 2A. In some alternate embodiments, millimeter-wave communication station 700 may utilize a switched-beam antenna, although the scope of the embodiments is not limited in this respect. In some alternate embodiments, millimeter-wave communication station 700 may utilize a single antenna element, although the scope of the embodiments is not limited in this respect.

In accordance with some embodiments, beamforming circuitry 702 may configure array antenna 722 to transmit an SS frame (e.g., one of beacon frames 502 of FIG. 5) separately in each of the antenna sectors 221. Beamforming circuitry 702 may also configure array antenna 722 to receive the reverse sector-sweep frames (e.g., frames 504 and 506 of FIG. 5).

In accordance with some embodiments, when millimeter-wave communication station 700 operates as an initiating station 101 for performing multiple-access beamforming with one or more responding stations, such as responding stations 102 and 103, the processing circuitry 704 may be configured to announce a number of SS slots 304 (FIG. 3) of a BFT period 306 (FIG. 3) and a number of SS frames of each SS slot 304. The receiver circuitry 708 may be configured to receive one or more SS frames 504, 506 from two or more of the responding stations within one of the SS slots 304 of the BFT period 306. The transmitter circuitry 706 may be configured to transmit one or more SS feedback frames 508 to the responding stations within the one SS slot 304 to indicate to the responding stations an antenna configuration for communication with the initiating station 101.

In accordance with some embodiments, when millimeter-wave communication station 700 operates as a responding station, such as responding station 102, for performing multiple-access beamforming with an initiating station, the processing circuitry 704 may receive an announcement from an initiating station, such as initiating station 101, announcing a number of SS slots 304 of a BFT period 306 and a number of SS frames of each SS slot 304. The transmitter circuitry 706 may transmit one or more SS frames 504, 506 to the initiation station within one of the SS slots 304 of the BFT period 306. The receiver circuitry 708 may be configured to receive one or more SS feedback frames 508 within the one SS slot 304 indicating an antenna configuration for communication with the initiating station. The responding station may be configured to transmit a limited number of SS frames 504 per SS slot 304 based on the number of SS frames announced by the initiating station, and each transmitted SS frame from the initiating station may indicate the an antenna configuration for communicating with the responding station. The responding station may also be configured to transmit any additional SS frames 504 in a next SS slot of the beamforming training period 306.

In accordance with some embodiments, when the millimeter-wave communication station 700 operates as a responding station, such as responding station 102, for performing multiple-access beamforming with an initiating station, such as initiating station 101, the processing circuitry 704 may be configured to initiate a random backoff procedure at the start of a BFT period 306 to determine which SS slot 304 of the BFT period 306 to begin transmissions of an SS frame 504. The processing circuitry 704 may also be configured to limit a number of SS frames 504 transmitted per SS slot 304 as indicated by the initiating station. The transmitter circuitry 706 may be configured to resume transmission of SS frames 504 at a start of a next SS slot within a current BFT period 306 when the responding station has more SS frames 504 to transmit.

Millimeter-wave communication station 700 may include other circuitry for communicating millimeter-wave wireless communication signals, including 60 GHz wireless technologies. In some embodiments, millimeter-wave communication station 700 can be used to provide a flexible interface that can be efficiently embedded into home media gateways, cell phones, flat panel televisions (TVs), set-top boxes, Blu-ray players, digital cameras, personal computers (PCs), laptops, and many other multimedia and communication devices. Although millimeter-wave communication station 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of millimeter-wave communication station 700 may refer to one or more processes operating on one or more processing elements.

Figure 8:
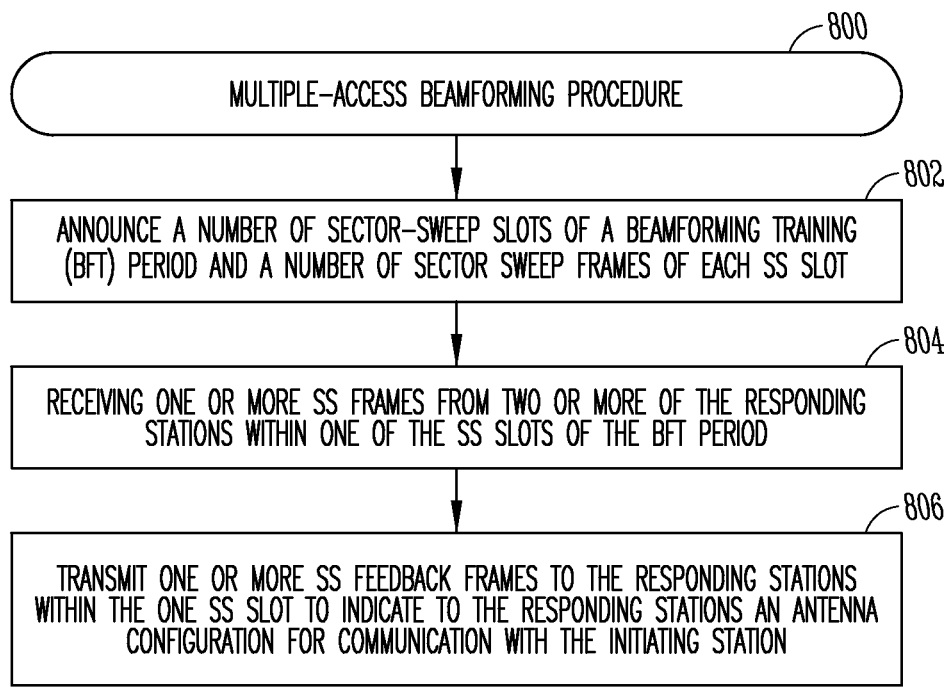
FIG. 8 is a procedure for multiple-access beamforming, in accordance with some embodiments.

FIG. 8 is a procedure for multiple-access beamforming, in accordance with some embodiments. Procedure 800 may be performed by millimeter-wave communication stations, such as millimeter-wave communication stations 101-104 (FIG. 1).

In operation 802, the initiating station 101 may announce the number of SS slots 304 (FIG. 3) of a BFT period 306 (FIG. 3) and a number of SS frames of each SS slot 304.

In operation 804, the initiating station 101 may receive one or more SS frames 504, 506 (FIG. 5) from two or more of the responding stations within one of the SS slots 304 of the BFT period 306. The responding stations may transmit a limited number of SS frames 504 per SS slot 304 based on the number of SS frames announced by the initiating station 101.

In operation 806, the initiating station may transmit one or more SS feedback frames 508 (FIG. 5) to the responding stations within the one SS slot 304 to indicate an antenna configuration to the responding stations for communication with the initiating station 101. The responding stations may transmit any additional SS frames 504 in a next SS slot of the beamforming training period 306.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a wireless communication device, the apparatus comprising:
receiver circuitry configured to receive RF signals including, during a beacon interval, an announcement of an indication of a number of sector-sweep slots that are to occur in a subsequent association beamforming training period (A-BFT) during the beacon interval within which the announcement is received, the sector-sweep slots comprising available time slots;
processing circuitry configured to use a random backoff procedure to determine a backoff amount to delay transmission of sector-sweep frames of a reverse sector sweep within a first of the sector-sweep slots; and
transmitter circuitry configured to transmit RE signals including at least some of the sector-sweep frames of the reverse sector sweep during the sector-sweep slot at a time based on the backoff amount, the processing circuitry to configure the receiver circuitry and the transmitter circuitry,
wherein a number of sector-sweep frames of the reverse sector sweep is based on a number of antenna sectors,
wherein when additional sector-sweep frames of the reverse sector sweep are to be transmitted, the processing circuitry is configured to decrease the backoff amount for transmission the additional sector-sweep frames in a next sector-sweep slot of the A-BFT.

2. The apparatus of claim 1, wherein the receiver circuitry is further configured by the processing circuitry to receive a feedback frame during the first sector-sweep slot in response to the transmission of the sector-sweep frames of the reverse sector-sweep,
wherein when the feedback frame is not received during the first sector-sweep slot, the processing circuitry is configured to decrease the backoff amount for of transmission the sector- sweep frames in the next sector-sweep slot of the A-BFT.

3. The apparatus of claim 2, wherein the processing circuitry further configures the transceiver circuitry and the receiver circuitry to perform a beamforming refinement phase subsequent to the A-BFT.

4. The apparatus of claim 2, wherein the processing circuitry further configures the transceiver circuitry and the receiver circuitry to perform the beamforming refinement phase during a same beacon interval as the reverse sector sweep.

5. A method of wireless communication performed by a wireless communication device, the method comprising:
receiving, by a responding station during a beacon interval, an announcement of an indication of a number of sector-sweep slots that are to occur in a subsequent association beamforming training period (A-BFT) during the beacon interval within which the announcement is received, the sector-sweep slots comprising available time slots;
using a random backoff procedure to determine a backoff amount to delay transmission of sector-sweep frames of a reverse sector sweep within a first of the sector-sweep slots; and
transmitting RF signals including at least some of the sector-sweep frames of the reverse sector sweep during the first sector-sweep slot at a time based on the backoff amount,
wherein a number of sector-sweep frames of the reverse sector sweep is based on a number of antenna sectors,
wherein when additional sector-sweep frames of the reverse sector sweep are to be transmitted, the method further comprises decreasing the backoff amount for transmission the additional sector-sweep frames in a next sector-sweep slot of the A-BFT.

6. The method of claim 5, further comprising receiving a feedback frame during the first sector-sweep slot in response to the transmission of the sector-sweep frames of the reverse sector-sweep,
wherein when the feedback frame is not received during the first sector-sweep slot, the processing circuitry is configured to decrease the backoff amount for of transmission the sector- sweep frames in the next sector-sweep slot of the A-BFT.

7. The method of claim 6, further comprising performing a beamforming refinement phase subsequent to the A-BFT.

8. The method of claim 6, further comprising performing a beamforming refinement phase during a same beacon interval as the reverse sector sweep.

9. An apparatus of a wireless communication device configured to operate as a responding station in a wireless communication network, the apparatus comprising: one or more processors and memory, programmed to provide instructions to cause transceiver circuitry of the wireless communication device to:
receive RF signals including during a beacon interval, an announcement of an indication of a number of sector-sweep slots that are to occur in a subsequent association beamforming training period (A-BFT) during a same beacon interval as the announcement, the sector-sweep slots comprising available time slots;
use a random backoff procedure to determine a backoff amount to delay transmission of sector-sweep frames of a reverse sector sweep within a first of the sector-sweep slots; and
transmit RF signals including at least some of the sector-sweep frames of the reverse sector sweep during the sector-sweep slot at a time based on the backoff amount,
wherein a number of sector-sweep frames of the reverse sector sweep is based on a number of antenna sectors,
wherein when additional sector-sweep frames of the reverse sector sweep are to be transmitted, the one or more processors are configured to decrease the backoff amount for transmission the additional sector-sweep frames in a next sector-sweep slot of the A-BFT.

10. The apparatus of claim 9, wherein the instructions further cause the transceiver circuitry to receive a feedback frame during the first sector-sweep slot in response to the transmission of the sector-sweep frames of the reverse sector-sweep,
wherein when the feedback frame is not received during the first sector-sweep slot, the processing circuitry is configured to decrease the backoff amount for of transmission the sector-sweep frames in the next sector-sweep slot of the A-BFT.

11. The apparatus of claim 10, wherein the instructions further cause the transceiver circuitry to perform a beamforming refinement phase subsequent to the A-BFT.

12. The apparatus of claim 10, wherein the instructions further cause the transceiver circuitry to perform a beamforming refinement phase during a same beacon interval as the reverse sector sweep.

13. An apparatus for a wireless communication device, the apparatus comprising:
transmitter circuitry configured to transmit RF signals including an announcement by an initiating station during a beacon interval, the announcement including an indication of a number of sector-sweep slots that are to occur during a subsequent association beamforming training period (A-BFT) during a same beacon interval as the announcement, the sector-sweep slots comprising available time slots; and receiver circuitry, coupled to the transmitter circuitry, configured to receive RF signals including at least some sector-sweep frames of a reverse sector sweep from a responder station during a first sector-sweep slot after a time based on a backoff amount, wherein a number of sector-sweep frames of the reverse sector sweep is based on a number of antenna sectors, wherein the receiver circuitry is further configured to receive additional sector-sweep frames of the reverse sector sweep in a next sector-sweep slot of the A-BFT after a decreased backoff amount.

14. The apparatus of claim 13, wherein the receiver circuitry is configured to receive a reverse sector-sweep frame from a responding station during one of the indicated slots, and wherein the transmitter circuitry is configured to transmit a feedback frame to the responding station during said one of the indicated slots.

15. The apparatus of claim 14, wherein the receiver circuitry and the transmitter circuitry are further configured to perform a beamforming refinement phase subsequent to said A-BFT.

16. The apparatus of claim 14, wherein the receiver circuitry and the transmitter circuitry are further configured to perform a beamforming refinement phase during a same beacon interval.

17. A method of wireless communication performed by a wireless communication device, comprising:

transmitting RF signals including an announcement by an initiating station during a beacon interval, the announcement including an indication of a number of sector-sweep slots that are to occur during a subsequent association beamforming training period (A-BFT) during a same beacon interval as the announcement, the sector-sweep slots comprising available time slots; and receiving RF signals including at least some sector-sweep frames of a reverse sector sweep from a responder station during a first sector-sweep slot after a time based on a backoff amount, wherein a number of sector-sweep frames of the reverse sector sweep is based on a number of antenna sectors, wherein the method further includes receiving additional sector-sweep frames of the reverse sector sweep in a next sector-sweep slot of the A-BFT after a decreased backoff amount.

18. The method of claim 17, further comprising:

receiving a reverse sector-sweep frame from a responding station during one of the indicated slots; and transmitting a feedback frame to the responding station during said one of the indicated slots.

19. The method of claim 18, further comprising performing a beamforming refinement phase subsequent to said A-BFT.

20. The method of claim 18, further comprising performing a. beamforming refinement phase during a same beacon interval.

21. An apparatus of a wireless communication device, the apparatus comprising one or more software-configured elements arranged to configure the wireless communication device for wireless communication, the one or more software-configured elements comprising:

one or more processors and memory, programmed to provide instructions to cause:

transceiver circuitry of an initiating station to transmit RF signals including an announcement during a beacon interval, the announcement including an indication of a number of sector-sweep slots that are to occur during a subsequent association beamforming training period (A-BFT) during a same beacon interval as the announcement, the sector-sweep slots comprising available time slots; and receiver circuitry to receive RF signals including at least some sector-sweep frames of a reverse sector sweep from a responder station during a first sector-sweep slot after a time based on a backoff amount, wherein a number of sector-sweep frames of the reverse sector sweep is based on a number of antenna sectors, wherein the receiver circuitry is further configured to receive additional sector-sweep frames of the reverse sector sweep in a next sector-sweep slot of the A-BFT after a decreased backoff amount.

22. The apparatus of claim 21, wherein the instructions further configure the transceiver circuitry to:

a reverse sector-sweep frame from a responding station during one of indicated slots; and transmit a feedback frame to the responding station during said one of the indicated slots.

23. The apparatus of claim 22, wherein the instructions further cause the transceiver circuitry to perform a beamforming refinement phase subsequent to said A-BFT.

24. The apparatus of claim 22, wherein the instructions further cause the transceiver circuitry to perform a beamforming refinement phase during a same beacon interval.

* * * * *